(12) United States Patent
Yeh et al.

(10) Patent No.: US 8,874,375 B2
(45) Date of Patent: Oct. 28, 2014

(54) DIGITAL MAP PROJECTION

(75) Inventors: Ching-Yun Yeh, Tampa, FL (US);
Kumar Annamraju, Tampa, FL (US);
Anurag X. Singh, UttarPradesh (IN);
Nageswara R. Tanuku, Nanuet, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 556 days.

(21) Appl. No.: 12/899,224

(22) Filed: Oct. 6, 2010

(65) Prior Publication Data

US 2012/0089333 A1    Apr. 12, 2012

(51) Int. Cl.
*G06F 19/00* (2011.01)
*G01C 21/20* (2006.01)
*G09B 29/00* (2006.01)

(52) U.S. Cl.
CPC .............. *G01C 21/20* (2013.01); *G09B 29/005* (2013.01)
USPC .............................................. 702/5; 701/533

(58) Field of Classification Search
CPC .................................................... G01V 11/00
USPC .............................................. 702/5; 701/533
See application file for complete search history.

(56) References Cited

U.S. PATENT DOCUMENTS

| | | | |
|---|---|---|---|
| 5,406,491 A * | 4/1995 | Lima | 701/412 |
| 2005/0210131 A1* | 9/2005 | Motoyama et al. | 709/224 |
| 2005/0283503 A1* | 12/2005 | Hancock et al. | 707/200 |
| 2010/0114471 A1* | 5/2010 | Sugiyama et al. | 701/200 |
| 2010/0114475 A1* | 5/2010 | Shin et al. | 701/201 |
| 2010/0171757 A1* | 7/2010 | Melamed | 345/632 |

\* cited by examiner

*Primary Examiner* — Patrick Assouad
*Assistant Examiner* — Haidong Zhang

(57) ABSTRACT

A computer receives a set of Cartesian data and a set of geodetic data. A set of control points may be generated. A plurality of sets of Cartesian coordinates for each control point may be determined, wherein each set of coordinates corresponds to a Cartesian system. A deviation is determined for a combination that includes a control point and a Cartesian system. For each set of Cartesian coordinates associated with the Cartesian system that is included in the combination, and further associated with a control point not in the combination, the set of coordinates is modified according to the deviation. A cumulative deviation is determined for a plurality of combinations by determining a sum of distances of each set of modified Cartesian coordinates from the coordinates of the corresponding point in the Cartesian data. A combination associated with a minimum cumulative deviation is identified.

25 Claims, 5 Drawing Sheets

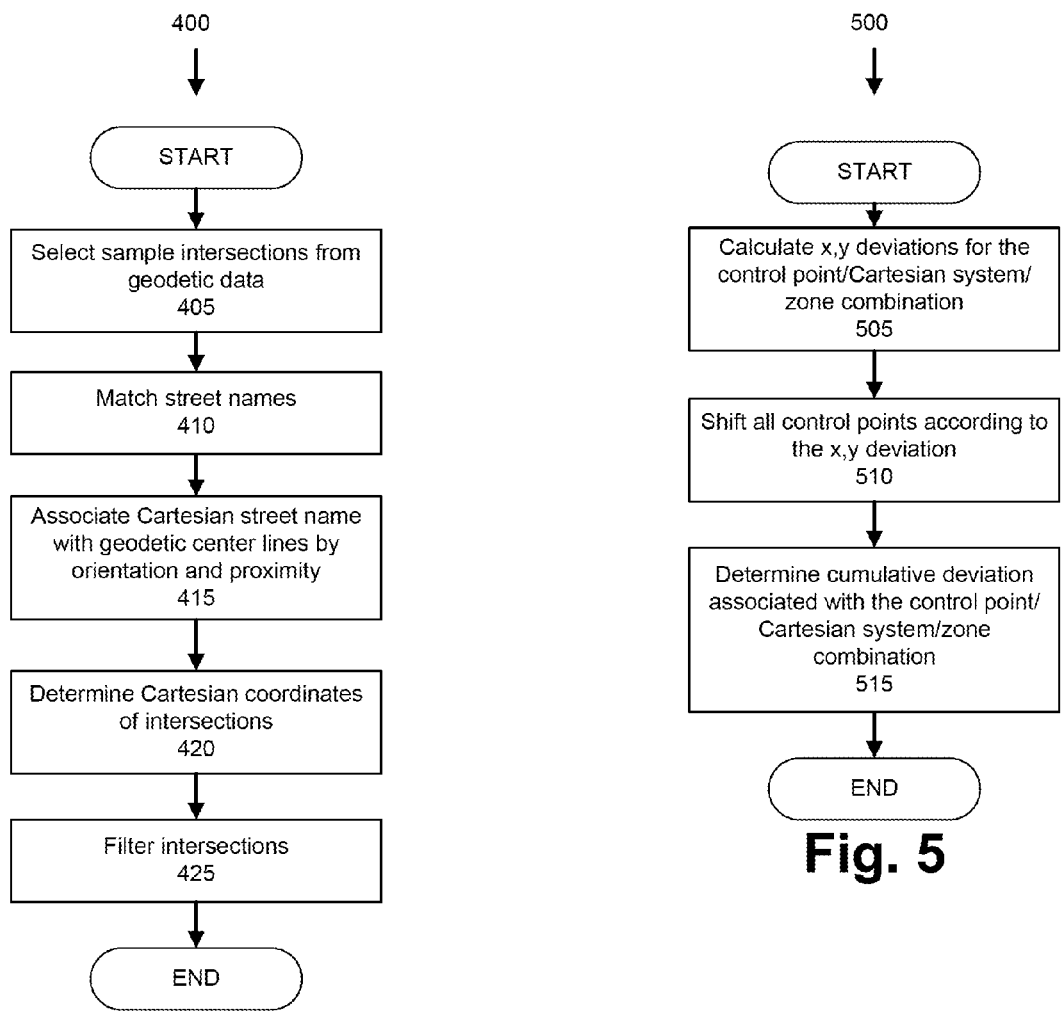

DIGITAL MAP PROJECTION

BACKGROUND INFORMATION

Geodetic reference systems may be used by the Global Positioning System. Accordingly, mapping data according to a geodetic system may be very useful in a variety of applications. For example, systems using the North American Datum, e.g., the North American Datum of 1927 (NAD27) or the North American Datum of 1983 (NAD83), are geodetic systems. Similarly, the World Geodetic System, which presently uses data according to the WGS 84 and serves as the reference system for the Global Positioning System, is a geodetic system. In a geodetic system, a location is provided with respect to a reference ellipsoid according to latitude, longitude, and height coordinates.

Mapping data may be provided in other formats, e.g., Cartesian formats such as the Universal Transverse Mercator (UTM) or State Plane Coordinate System (SPC or SPCS). In these Cartesian formats, the surface of the earth is divided into zones, and locations in each grid are identified according to X and Y coordinates, often referred to as "offsets," that provide values representing a distance, e.g., in feet, from a designated point of origin, the coordinates generally referred to as Easting and Northing, respectively. Considerable amounts of useful map data exists in Cartesian formats. Unfortunately, present mechanisms for projecting Cartesian mapping data into a geodetic system are lacking.

BRIEF DESCRIPTION OF THE DRAWINGS

FIG. 4 illustrates an exemplary process for selecting sample points, e.g., sample intersections, from geodetic data for matching to points in Cartesian data.

FIG. 5 illustrates an exemplary process for calculating cumulative deviations, i.e., differences between coordinates in geodetic data projected into a Cartesian system according to a Cartesian system/zone combination, and coordinates in Cartesian data, for a control point in a grid portion.

DETAILED DESCRIPTION OF PREFERRED EMBODIMENTS

Figure 1:
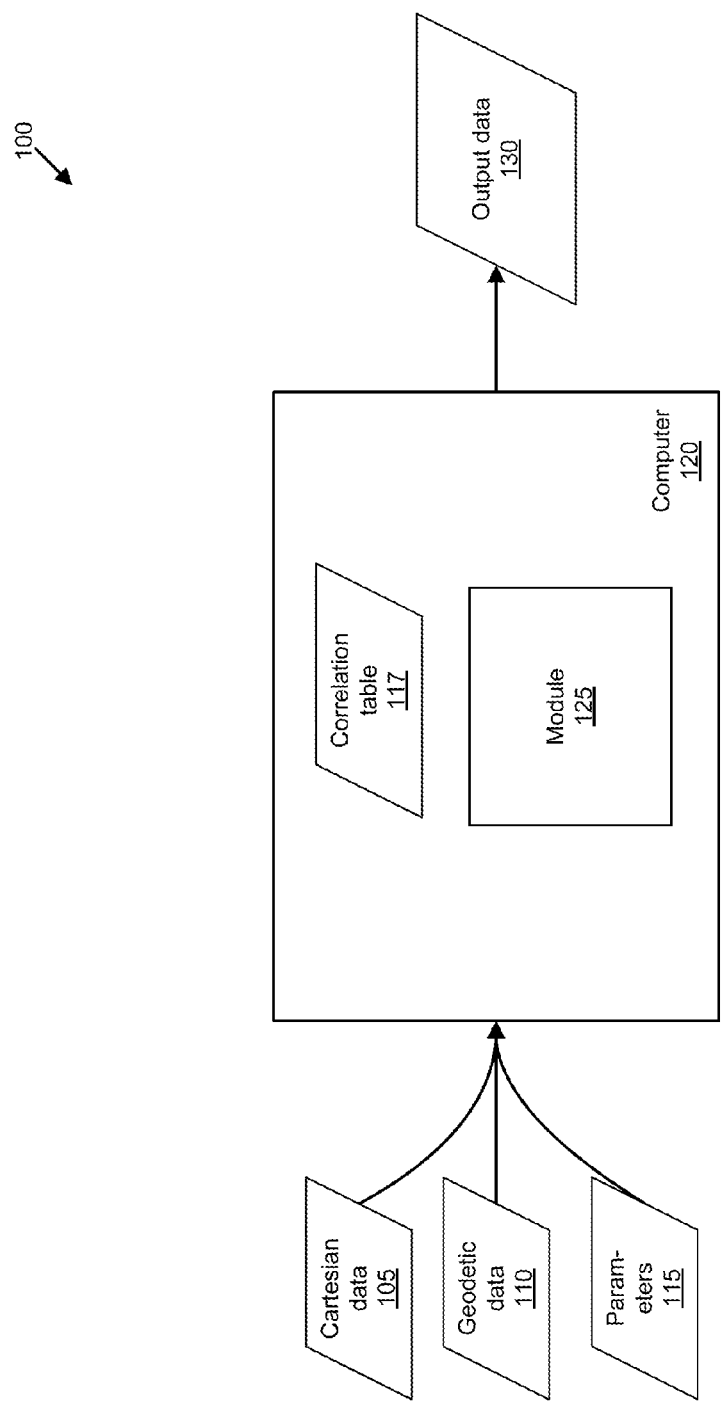
FIG. 1 illustrates an exemplary system for projecting Cartesian mapping data into a geodetic system.

FIG. 1 illustrates an exemplary system 100 for projecting Cartesian mapping data into a geodetic system. The system 100 includes a computer 120 that generally includes and/or accesses, e.g., via a network, a peripheral cable, a wireless protocol, etc., one or more computer readable media. Cartesian data 105, geodetic data 110, and parameters 115 all may be provided as input to the computer 120 and/or may be stored on the one or more computer readable media included in or accessible by the computer 120. Correlation table 117, which associates UTM and SPC zones with geographic regions, e.g., states and/or counties, etc., is generally stored on a computer-readable medium associated with computer 120. A projection module 125 may include instructions executable by one or more processors included in computer 120, and the module 125 may also be stored on a computer readable medium. Processing by the module 125 may provide output data 130, which in turn may be stored on a computer readable medium.

Cartesian data 105 is generally provided according to standards such as UTM or SPCS, but may also be formatted according to other standards, e.g., the Unit Of Resolution system used in the MicroStation computer assisted design (CAD) product of Bentley Systems Inc. of Exton, Pa. As mentioned above, UTM and SPCS each divide the earth, or at least parts of the earth, into a grid. For example, UTM includes sixty zones, each generally 6° of longitude wide. Coordinates within each zone are expressed as "easting" and "northing" in feet or meters with respect to a point of origin within the zone.

SPCS divides the United States and certain of its possessions, into over 120 zones. Two sets of SPCS data are generally in use. In SPC27, NAD27 data is used to identify points of origins for the respective SPCS zones. In SPC83, NAD83 data is used to identify points of origins for the respective SPCS zones.

Cartesian data 105 is generally associated with a selected geographic area. For example, Cartesian data 105 may be associated with a city, a section of a city, a section of a state, etc. In some cases, Cartesian data 105 may be a map for a service area maintained by a utility. For example, Cartesian data 105 may represent a wire center for a telecommunications utility, a wire center generally including a central office, i.e., a facility that includes switches and other equipment for routing communications in a telecommunications network such as the Public Switched Telephone Network (PSTN), the wire center also generally including surrounding infrastructure serviced by the central office.

Records of Cartesian data 105 may provide data concerning features present in a Cartesian grid in a format consistent with a vector format such as Scalable Vector Graphics (SVG) or the like. For example, arcs, ellipses, curves, etc. may all be represented as a series of line segments having direction and magnitude. Shapes such as polygons, circles, ellipses, etc. may be represented according to line segments, points and distances, e.g., a center and a radius of a circle, etc. Records of Cartesian data 105 may include offsets describing a distance, e.g., in feet, of a point from an origin of the Cartesian grid. For example, x and y offsets may be described as "Easting" and "Northing" distances, respectively. Where a record pertains to a feature that includes more than one point, as is often the case, e.g., a feature associated with a line, circle, polygon, etc., Eastings and Northings for each point may be included. Further, records of Cartesian data 105 may also include a record identifier, along with a feature description of the point, e.g., a street name, a building name, a river name, etc.

Records of Cartesian data may also include codes obtained from Federal Information Processing Standards (FIPS) provided by the Information Technology Laboratory that is part of the National Institute of Standards and Technology (NIST), an agency of the U.S. Commerce Department. Specifically, Cartesian data 105 including a geographic area associated with a state and/or a county, may include a FIPS codes for the state and/or county, respectively.

Geodetic data 110 generally adheres to a geodetic reference system such as the NAD27 or NAD83. Geodetic data 110 is generally selected to correspond as closely as possible to the geographic area associated with Cartesian data 105. For example, geodetic data may be identified according to a Common Language Location Identifier (CLLI) Code such as is provided by Telcordia Technologies, Inc. of Piscataway, N.J.

Cartesian data may be likewise identified, or may be identified according to other geographic codes that may be correlated to CLLI codes. Of course, Cartesian data 105 and geodetic data 110 could be associated through some identifier other than a CLLI code.

A record of geodetic data 110 generally includes a latitude and a longitude of a point of interest, along with a unique or substantially unique identifier and a description of the point of interest, e.g., names of two streets that intersect at the point. Geodetic data 110 may further include FIPS codes, as described above.

Parameters 115 may be included in a file, e.g., a file formatted according to extensible markup language (XML) or some other standard format. Parameters 115 may specify parameters for overlaying a grid onto Cartesian data 105, e.g., a number of rows and columns forming grid portions in the Cartesian data 105, and a number of sampling points that are to be used within each grid portion. Accordingly, module 125 may project features in Cartesian data 105 into a geodetic system according to geodetic data 110, and parameters 115, thereby generating output data 130. Further, as explained in detail below, points in Cartesian data 105 may be projected into the geodetic system with a minimum deviation from an ideal representation of a location of the points and the Cartesian data 105.

As mentioned above, correlation table 117 generally associates UTM and SPC zones with geographic regions, e.g., states and/or counties, etc. For example, in one implementation, records in correlation table 117 includes fields for a state name and/or identifier, a county name and/or identifier (or in some cases, a name and/or identifier for some other jurisdiction, e.g., a parish, a borough, an island, etc.), an SPC27 zone identifier, an SPC83 zone identifier, and a UTM zone identifier. Further, correlation table 117 records generally include a latitude and longitude associated with a centroid point in the geographic region, e.g., state. In some cases, the county name and identifier are omitted, because processing that relies on correlation table 117 is performed at a state level of granularity, and county information is not considered. In any event, as will be described in more detail below, correlation table 117 thus allows selection of various Cartesian projection systems, e.g., SPC27, SPC83, and UTM, for evaluating projections of Cartesian data 105 into a geodetic system. Although the correlation records 117 are generally referred to as a table, it is to be understood that such records could be stored in a format other than a table, or other than in a relational database.

Figure 2:
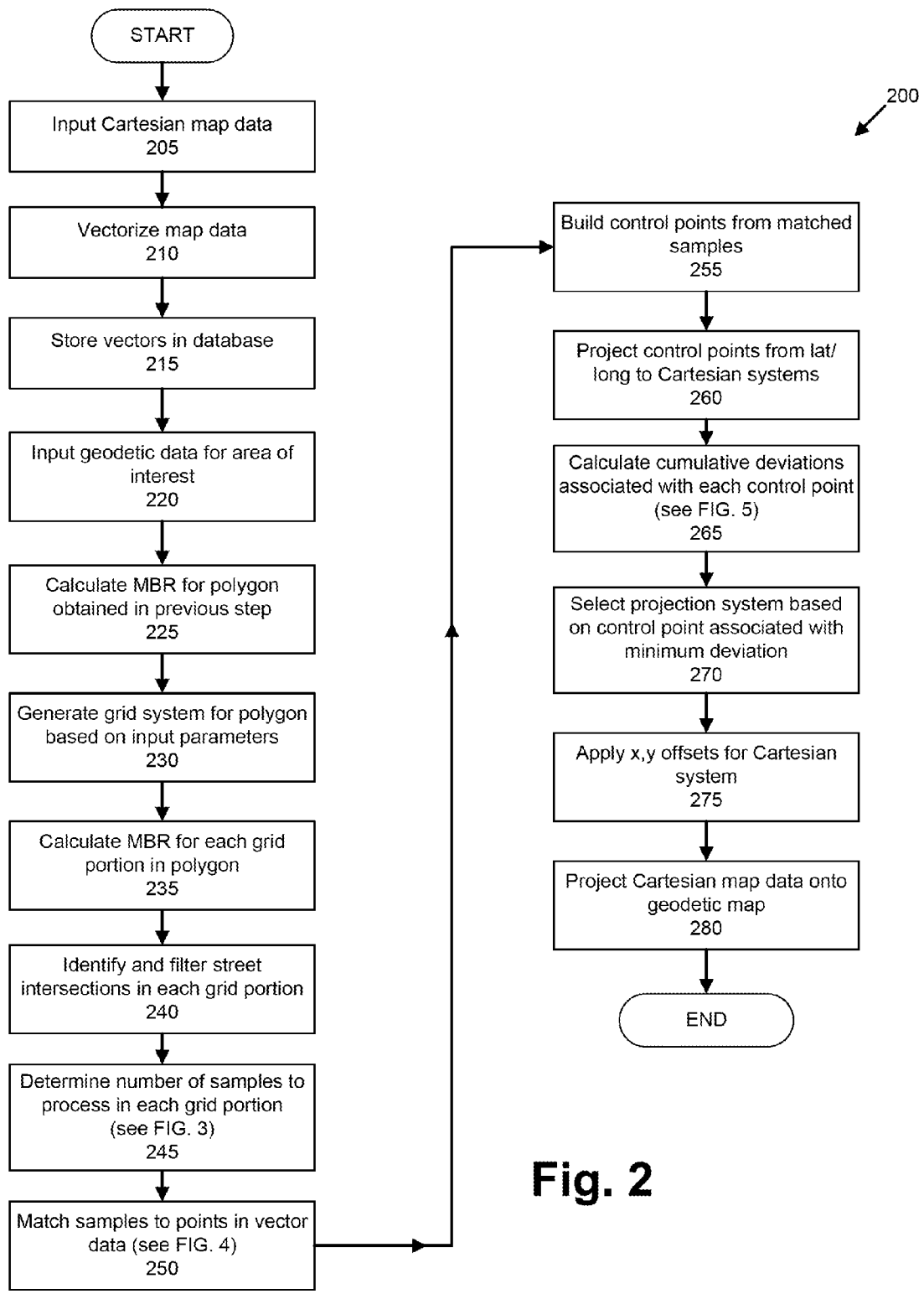
FIG. 2 illustrates an exemplary process for generating a projection of Cartesian data into a geodetic system.

FIG. 2 illustrates an exemplary process 200 for generating a projection of Cartesian data 105 into a geodetic system that includes geodetic data 110. Process 200 is generally carried out according to instructions included in module 125 that are executed by a processor of computer 120.

Further, process 200 is generally carried out according to certain assumptions. First, for example, Cartesian data 105 and geodetic data 110 are assumed to include street names, i.e., textual descriptions of streets. Second, geodetic data 110 is further assumed to include street center lines. Third, geodetic data 110, including a boundary of the data 110, and street lines of the data 110, may be expressed in terms of latitude and longitude. Fourth, geodetic data 110 overlaps all or substantially all of an area represented by Cartesian data 105, i.e., the Cartesian data 105 can be projected onto latitude and longitudes represented in the geodetic data 110. Fifth, geodetic data 110 street line records are assumed to be segmented according to intersections, but Cartesian data 105 is not; Cartesian data 105 may or not include segmented streets.

Inputs to process 200 generally include one or more sets of Cartesian data 105 for a designated geographic area, and a set of geodetic data 110 for the same, or approximately the same, designated geographic area. For example, in one implementation, a first set of Cartesian data 105 in UTM format, and a second set of Cartesian data 105 in SPC format, both covering a same geographic area of interest, are provided as input to process 200.

The geodetic data 110 input to process 200 generally includes street line information, e.g., street coordinates, generally coordinates of street center lines, and street names, for the geographic area. Further, input to process 200 generally includes parameters 115, specifying a number of rows and columns for making a grid to cover the designated geographic area, and also specifying a number of sample, or representative, points to be used within each portion, i.e., section, of the grid. A number of rows and columns in a grid may be specified according to a size of the designated geographic area, an expected street density of the geographic area, etc. Similarly, a number of representative points to be used within each region of the grid may be determined according to a size of each area of the grid, expected street densities of areas of the grid, etc.

The process 200 begins in a step 205, in which a set of Cartesian data 105, e.g., a set of Cartesian data 105 describing the designated geographic area, is provided to module 125.

Next, in step 210, the data 105 is processed to facilitate projection of features in Cartesian data 105 into a geodetic system. As discussed above, landbase features in the data 105 are generally represented in vector format. For example, Cartesian data 105 could describe a circle. However, when the circle is projected onto a geodetic coordinate system, it will properly be rendered as an ellipse. Therefore, one example of processing undertaken to facilitate projection of features in Cartesian data 105 into a geodetic system includes interpolating data into Cartesian data 105 to describe a circle as an ellipse, e.g., including major and minor axes, circumferential points, etc. An arc could be similarly treated. Of course, depending on the format in condition of Cartesian data 105 input to the process 200, step 210 could be only minimally necessary, or not necessary at all.

Next, in step 215, once data 105 is rendered into a vector format that will allow for its display when projected into a geodetic system, files including the data 105 may be stored in a data store, e.g., a database, included in or accessible by computer 120.

Next, in step 220, geodetic data 110 for the geographic region of interest is provided to module 125. Geodetic data 110 generally defines a polygon, e.g., boundaries for the geographic region of interest.

Next, in step 225, module 125 determines the minimum and maximum range (MBR) of the polygon defined by geodetic data 110. For example, bounding points, e.g., lower left and upper right corners of the polygon, expressed in terms of latitude and longitude, may be determined.

Next, in step 230, module 125 generates a grid, generally according to a number of rows and columns specified in parameters 115, to be overlaid on the polygon whose range was determined in the preceding step.

Next, in step 235, module 125 determines the MBR, e.g., bounding lower left and upper right corners, for each grid portion, e.g., square or rectangle in the grid generated in the preceding step.

Next, in step 240, for each grid portion, module 125 identifies street intersections within the grid portion. Further, module 125 generally filters the street intersections identified. For example, street name prefixes and suffixes, e.g., "West," "Northwest," etc. may be removed. Also, some intersections, e.g., intersections that appear to be invalid, may be altogether removed from the set of identified street intersections for a grid portion. For example, if more than one intersection in a grid portion is associated with street names that appear to be the same, e.g., identical or very similar, apparently duplicate intersections may be removed.

Step 245 follows step 240. In step 245, module 125, generally according to a density of points of potential interest, e.g., street intersections in the grid portions, determines a number of points, sometimes referred to as samples, to be processed in each of the grid portions. A more detailed example of how to determine a number of points, e.g., street intersections, to process in each of the grid portions is provided below with respect to FIG. 3. In general, a purpose of determining a number of points of interest in a grid portion of according to a density is to increase the accuracy or precision with which Cartesian data 105 is projected onto geodetic data 110 for geographic areas that are more densely populated with features such as streets, etc.

Following step 245, in step 250, module 125 attempts to match selected sample points from geodetic data 110 to points in the vectorized version of Cartesian data 105 stored as described above with respect to steps 210 and 215. A more detailed example of how sample points are selected from geodetic data 110 and matched to points and Cartesian data 105 is provided below with respect to FIG. 4.

Following step 250, in step 255, module 125 builds what may be referred to as control points based on points matched in step 250, e.g., street intersections found to exist in both geodetic data 110 and Cartesian data 105. A record for a control point generally includes names and/or other identifiers for intersecting streets defining the point, geodetic coordinates, e.g., latitude and longitude information, Cartesian easting/northing information, e.g., in feet, and possibly other information as well.

Cartesian data 105 could be projected onto geodetic data 110 according to one or more projection models. For example, Cartesian data 105 could be projected onto geodetic data 110 according to either a UTM model, and SPC model, or both. As described with respect to the next step, each control point into one or more known Cartesian models so that, as described with respect to succeeding steps, parameters for projecting Cartesian data 105 into a geodetic system represented by geodetic data 110 may be determined.

Figure 6:
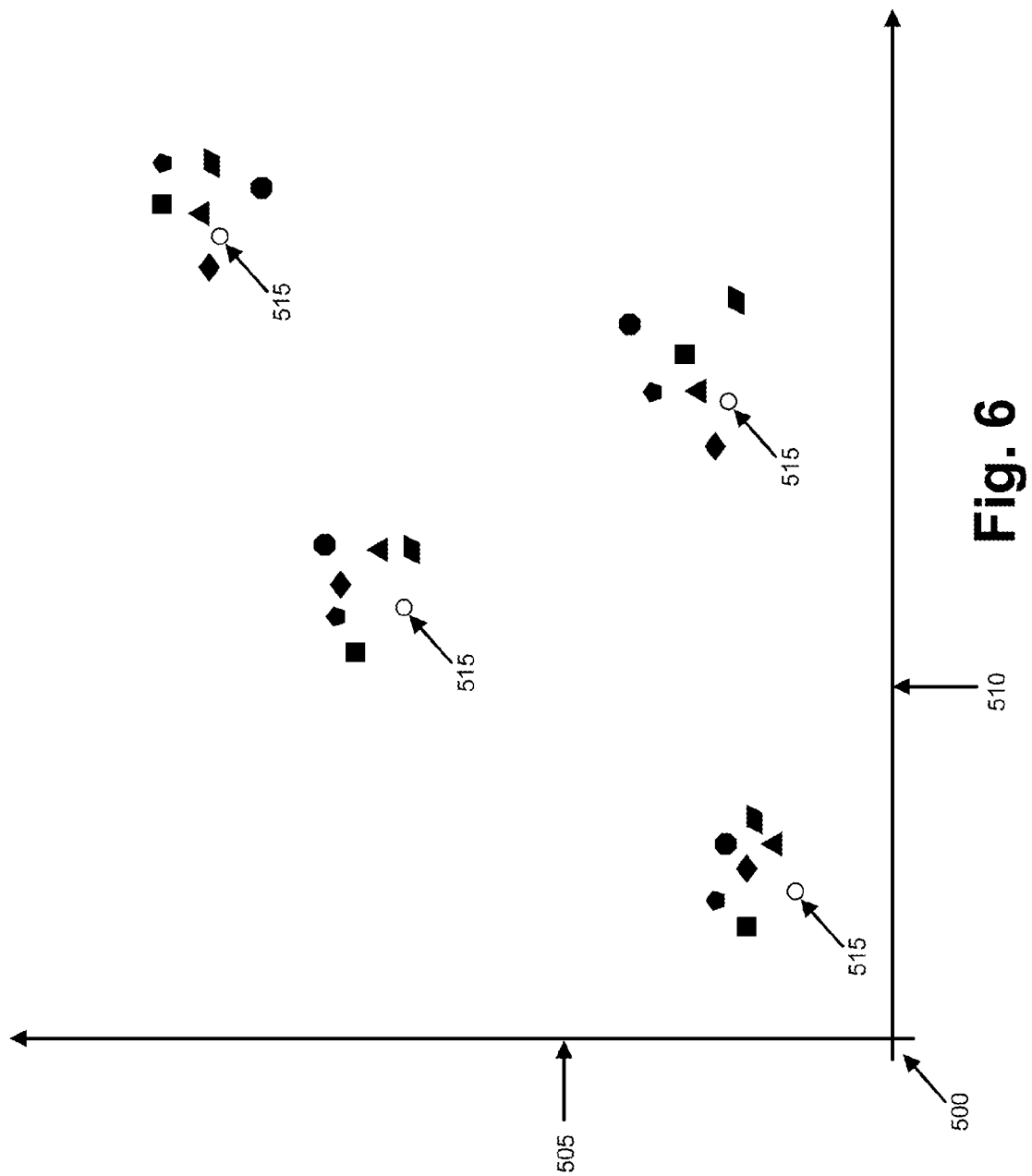
FIG. 6 illustrates an exemplary set of control points plotted in a coordinate system according to a plurality of different Cartesian models.

Next, in step 260, geodetic coordinates of each control point built in step 255 are projected into one or known models for Cartesian data 105. Generally, correlation table 117 is used to identify zones in various Cartesian systems, e.g., SCP27, SCP83, and UTM that overlay geographic areas associated with the geographic area covered by Cartesian data 105 and geodetic data 110. Accordingly, in step 260, multiple records may be created for each control point by projecting the geodetic coordinates included in the control point according to each Cartesian system identified in correlation table 117. For example, consider the case where correlation table 117 identifies, for a given state including a control point, zones for each of SPC27, SPC83, and UTM. Moreover, consider that, in this example, for two of the Cartesian systems, SPC27 and SPC83, most states include multiple zones, e.g., two zones. Thus, this disclosure refers to zone/Cartesian system combinations to mean a Cartesian system chosen for a projection according to coordinates determined by a particular zone in that Cartesian system. FIG. 6, discussed below, provides a visual example of control points projected according to a plurality of Cartesian models.

Therefore, continuing the foregoing example, module 125 creates six records representing six zone/Cartesian system combinations. For example, each record may include the fields included in a control point record as described above, and also may include an identifier and/or description of the zone/Cartesian system combination associated with the record, as well as easting and northing values for the control point in the zone/Cartesian system combination. The easting and northing values are obtained by comparing the latitude and longitude of the control point to the latitude and longitude of the point of origin for the zone/Cartesian system associated with the record, and converting differences in latitude and longitude to distance, e.g., in feet or meters.

Next, in step 265, module 125 assumes, for each of the records generated in step 260, that the control point identified in the record has been projected with complete accuracy. That is, the module 125 assumes that the deviation between the projected location of the control point, and the actual location of the control point is zero. Based on this assumption, the module 125 and then calculates deviations, e.g., by determining a Hausdorff distance, of all other control points from coordinates of the control point in Cartesian data 105. These deviations are then summed to obtain a cumulative deviation, as described in more detail below with respect to FIG. 5. In general, a cumulative deviation refers to the cumulative difference between actual Cartesian coordinates corresponding to a control point, and Cartesian coordinates corresponding to geodetic coordinates of the control point, i.e., projected geodetic coordinates as described above with respect to step 260. Thus, the deviation is sometimes referred to as an x, y deviation, because it is expressed in terms of an offset from an x-coordinate and an offset from a y-coordinate.

Next, in step 270, a zone/Cartesian system combination is selected based on its association with a control point associated with a minimum cumulative deviation, i.e., the smallest cumulative deviation determined in step 265 determines the zone/Cartesian system combination selected in step 270.

Next, in step 275, the minimum deviation identified in step 270, e.g., in terms of an x, y offset, is applied to all points in Cartesian data 105. Accordingly, output of process 200 are generally as follows: first, a projection model, e.g., UTM 27, etc., to be used for a projection; second, a zone to be used for a projection; third, an Easting, or what may be referred to as an "x-shift," coordinate to be applied when a projection is performed; fourth, a northing, or what may be referred to as a "y-shift," coordinate to be applied when a projection is performed.

Next, in step 280, Cartesian data 105 is projected into a geodetic system according to the foregoing parameters output from process 200. That is, using the identified coordinate system, e.g., UTM 27, for an identified UTM zone, coordinates from Cartesian data 105 are projected into geodetic coordinates, with the x-shift and y-shift applied.

Following step 280, process 200 ends.

Figure 3:
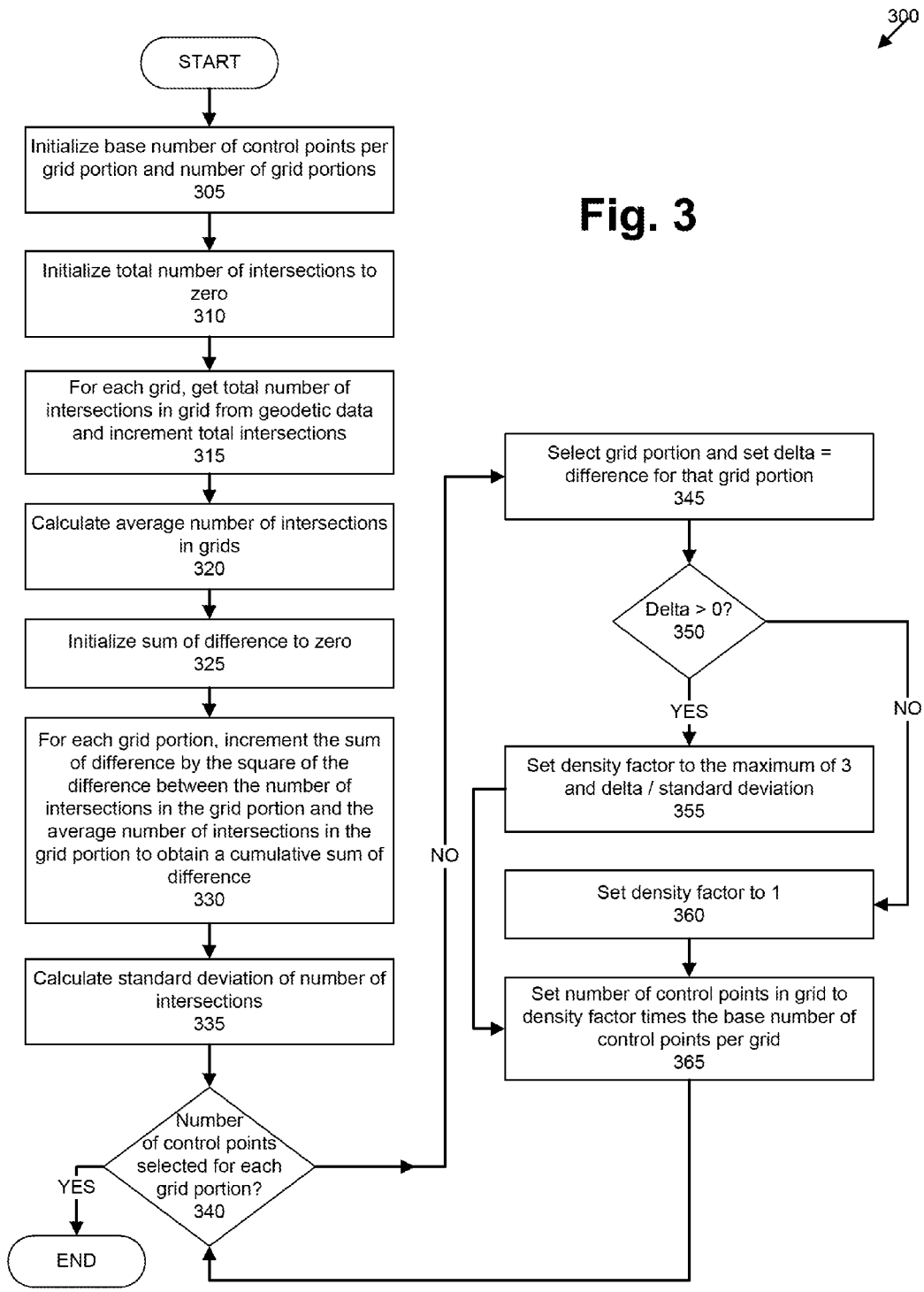
FIG. 3 illustrates an exemplary process for determining a number of control points to be processed in a portion of a grid overlaid on geodetic data.

FIG. 3 illustrates an exemplary process 300 for determining a number of control points to be processed in a portion of a grid overlaid on geodetic data 110, e.g., as described above with respect to process 200. As described herein, process 300 may be carried out according to instructions included in module 125, but process 300 could be carried out according to instructions in some other module interacting with module 125.

Process 300 begins in a step 305, in which parameters 115 are accessed to determine an initial number of control points to be considered in each portion, e.g., square, rectangle, etc. of a grid, and the number of rows and columns defining a grid overlaid on geodetic data 110.

Next, in step 310, module 125 initializes a variable representing a total number of intersections in a grid portion to zero.

Next, in step 315, module 125 determines a total number of street intersections in each grid portion, and assigns to the variable initialized in step 310 the total number of intersections in geodetic data 110. That is, for each grid portion, module 110 obtains a total number of intersections, and increments the variable by such number until all grid portions have been processed.

Next, in step 320, module 125 calculates an average number of street intersections in each portion of the grid overlaid on geodetic data 110.

Next, in step 325, module 125 initializes a variable referred to herein as "sum of difference" to zero.

Next, in step 330, for each grid portion, a variable referred to as "difference" is assigned a value obtained by subtracting the average calculated in step 320 from the number of intersections in the grid portion. The "sum of difference" variable is incremented according to the value of the "difference" variable, until a "difference" value has been obtained for all grid portions.

Next, in step 335, a standard deviation of the average number of intersections in each grid portion is calculated, e.g., by taking the square root of the "sum of difference" variable summed in the preceding step.

Next, in step 340, module 125 determines whether a number of control points has been selected for each portion of the grid. The first time step 340 is visited, a number of control points will not have been selected for any grid portion. Steps 345-365 are executed repeatedly, e.g., in a looping fashion, until each good portion has been assigned a number of control points to be processed. Accordingly, if a number of control points has not been selected for each grid portion, process 300 proceeds to step 345. Otherwise, once a number of control points has been selected for each grid portion, the process 300 ends.

Next, in step 345, module 125 selects a grid for processing, e.g., the module 125 may move through grid portions in an order from left to right and then row by row, and assigns a "delta" variable the value of the "difference" variable for that grid portion.

Next, in step 350, the module 125 determines whether the value of the "delta" variable is greater than zero. If yes, step 355 is executed next. If not, step 360 is executed next.

In step 355, which may follow step 350, module 125 sets a "density factor" variable to the maximum of 3 and the result of delta divided by the standard deviation calculated in step 335. Step 365 is executed following step 355.

In step 360, which may follow step 350, module 125 sets the value of the "density factor" variable to 1. Step 365 is executed following step 360.

In step 365, module 125 sets the number of control points to be processed in the grid portion identified in step 345 to the density factor multiplied by the base number of control points per grid portion that was obtained in step 305. Step 340 follow step 365.

FIG. 4 illustrates an exemplary process 400 for selecting sample points, e.g., sample intersections, from geodetic data 110 for matching to points in Cartesian data 105.

The process 400 begins in a step 405, in which selected street names from geodetic data 110 are matched to street names in Cartesian data 105. Street names are generally selected in pairs, e.g., according to intersections formed by streets. A number of intersections selected, e.g., a number of control points to build, may be determined as described above with respect to process 300. Street names for matching may be selected from geodetic data 110 in a variety of manners, e.g., randomly, according to alphabetic order, etc. If an intersection from geodetic data 110 cannot be matched to an intersection in Cartesian data 105, then another may be chosen for attempted matching according to the rules for selecting street names, e.g., random selection, selection in alphabetic order, etc.

Following step 405, in step 410, module 125 associates street names in Cartesian data 105 with center lines for matched streets in geodetic data 110 according to the orientation, e.g., north-south or east-west, of the street name in the Cartesian data 105, along with the proximity of the street name to the center lines.

Next, in step 415 Cartesian coordinates of street intersections are determined for the intersecting center lines identified in step 405. Thus, step 415 results in an initial set of control points for a grid portion.

Next, in step 420, the control points, e.g., street intersections, determined in step 415 are filtered to attempt to provide the data set with better integrity. For example, if two intersections have identical or very similar intersecting street names, both intersections are generally removed from the data set because it is not generally possible to tell which of the two intersections reflects correct coordinates. Following step 420, process 400 ends.

FIG. 5 illustrates an exemplary process 500 for calculating cumulative deviations, i.e., differences between coordinates in geodetic data 110 projected into a Cartesian system according to a Cartesian system/zone combination, and coordinates in Cartesian data 105, for a control point in a grid portion. Generally the process 500 is performed with respect to each Cartesian system/zone combination for each control point in a grid portion, and then the control point/Cartesian system/zone combination associated with a minimum cumulative deviation is selected as described above with respect to step 270 of process 200.

The process 500 begins in a step 505, in which module 125 selects a control point and determines a distance, e.g., a Hausdorff distance, of the control point when projected according to the Cartesian system/zone combination from coordinates of the street intersection corresponding to the control point in Cartesian data 105 for example, by knowing a latitude and longitude of the control point, and comparing this latitude and longitude to a latitude and longitude of a point of origin for the Cartesian system/zone combination. From this comparison, a distance of the control point from the point of origin may be determined. Further, values for easting and northing of the control points may be determined, and compared to easting and northing values for the street intersection corresponding to the control point in Cartesian data 105. The difference between easting values, and northing values respectively for the control point and the street intersection, may be referred to as an x,y deviation, i.e., a differences in coordinates along each of the x-axis and the y-axis for the Cartesian system/zone combination.

Next, in step 510, module 125 stores easting and northing values for each control point, other than the control point selected in step 505, after each control point has been shifted according to the x,y deviation determined in step 505. That is, these easting and northing values are determined by determining easting and northing values for the control point in the Cartesian system/zone being processed, and then applying the x,y deviation determined in step 505. Effectively, then, process 500 assumes that the deviation of the control point/Cartesian system/zone combination selected in step 505 is zero, i.e., that the control points/Cartesian system/zone combination precisely represents a location of the street intersection corresponding to the control point.

Next, in step 515, module 125 determines a cumulative deviation associated with the control point/Cartesian system/ zone combination selected in step 505. That is, the module 125 adds together the x,y deviations of each of the control points in the grid portion after the x, y deviation of the control point selected in step 505 has been applied. A visual example of determining a cumulative deviation is provided with respect to FIG. 6.

Following step 515, the process 500 ends.

FIG. 6 illustrates an exemplary set of control points 515 plotted in a coordinate system 500 according to a plurality of different Cartesian models. Coordinate system 500 includes a y-axis 505 and an x-axis 510. Points with respect to the axes 505 and 510 are generally plotted according to latitude and longitude, respectively. Each of the control points 515 reflects a location in geodetic data 110, e.g., in latitude and longitude. Proximate to each of the control points 515 are indicators of a location of the control point 515 according to each of a plurality of Cartesian projection models, where a projection model includes a Cartesian system and/or a zone.

For example, the following assumptions may be made with respect to FIG. 6. A circle represents the location of the control point 515 in geodetic data 110. A triangle shape indicates a location of the control point 515 according to a SPC 27 model for a first SPC zone. A square shape is associated with a SPC 83 model for the first SPC zone. A diamond is associated with the SPC 27 model for a second SPC zone. A parallelogram is associated with the SPC 83 model for the second SPC zone. A pentagon is associated with the UTM 27 model for a given UTM zone. An octagon is associated with the UTM 83 model for the given UTM zone.

In the example of FIG. 6, records may be created reflecting a latitude and longitude of each of the projections of control point 515, e.g., projections according to each of the six combinations of Cartesian model and zone. As discussed above, distances, e.g., Hausdorff distances, may be calculated between the actual geodetic control point 515, and the locations of the control point 515 indicated according to each of the Cartesian models. Then, as discussed above, cumulative distances may be calculated to determine, according to a minimum cumulative distance, a projection model to use for projecting Cartesian data 105 and onto geodetic data 110. For instance, in the example of FIG. 6, adding the distances of each shape respectively from each respective circle representing a geodetic location of the control point 515 provides the cumulative distances. In the example of FIG. 6, a cumulative distance of each of the four triangle shapes from the respective circle is less than the cumulative distances of any of the other shapes from their respective circles. Therefore, the Cartesian model chosen for the projection of the Cartesian data 105 inputs to process 200 would be the SPC 27 model.

Computing devices such as computer 110 may employ any of a number of computer operating systems, including, but by no means limited to, versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines (IBM) of Armonk, N.Y., and the Linux operating system. In one implementation, computer 110 is a mainframe computer sold by IBM, and uses IBM's z/OS operating system. Computing devices in general may include any one of a number of computing devices, including, without limitation, a computer workstation, a desktop, notebook, laptop, or handheld computer, or some other computing device.

Computing devices such as computer 110, etc., generally each include instructions executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases or data stores described herein may include various kinds of mechanisms for storing, accessing, and retrieving various kinds of data, including a hierarchical database, a set of files in a file system, an application database in a proprietary format, a relational database management system (RDBMS), etc. Each such database or data store is generally included within a computing device employing a computer operating system such as one of those mentioned above, and are accessed via a network in any one or more of a variety of manners. A file system may be accessible from a computer operating system, and may include files stored in various formats. An RDBMS generally employs Structured Query Language (SQL) in addition to a language for creating, storing, editing, and executing stored procedures, such as the PL/SQL language mentioned above. Database 115 may be any of a variety of known RDBMS packages, including IBMS DB2, or the RDBMS provided by Oracle Corporation of Redwood Shores, Calif.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
   (a) receiving, with the use of a processor in a computer, a set of Cartesian data and a set of geodetic data relating to a geographic area;
   (b) generating, with the use of the processor in the computer, a set of control points, each control point being associated with a coordinate expressed in terms of latitude and longitude, and with a corresponding point in the set of Cartesian data;
   (c) determining, with the use of the processor in the computer, a plurality of sets of Cartesian coordinates for each of the control points, each of the sets of Cartesian coordinates for one of the control points corresponding to a Cartesian system;
   (d) determining, with the use of the processor in the computer, a deviation for a combination, the combination including a control point and the corresponding Cartesian system, the deviation being a difference between coordinates for the point associated with the control point in the set of Cartesian data and the set of Cartesian coordinates for the control point;
   (e) modifying, with the use of the processor in the computer, a matched set of Cartesian coordinates according to the deviation, wherein the matched set of Cartesian coordinates include at least one set of Cartesian coordinates associated with the Cartesian system that is included in the combination, but further associated with a control point not in the combination;
   (f) determining, with the use of the processor in the computer, a cumulative deviation for the combination by determining a sum of distances of each set of matched Cartesian coordinates modified in step (e) from the coordinates for the point associated with the control point in the Cartesian data corresponding to the matched Cartesian coordinates;
   (g) repeating, with the use of the processor in the computer, steps (e)-(f) for a plurality of combinations; and
   (h) identifying, with the use of the processor in the computer, a combination associated with a minimum cumulative deviation.

2. The method of claim 1, further comprising using easting and northing components of the minimum cumulative deviation to project points in the set of matched Cartesian data into the geodetic data.

3. The method of claim 1, wherein the Cartesian system is one of Universal Transverse Mercator (UTM) or State Plane Coordinate System (SPC).

4. The method of claim 1, wherein the geodetic data is based on a North American Datum.

5. The method of claim 1, wherein the combination further includes a zone associated with the Cartesian system.

6. The method of claim 1, wherein step (g) includes repeating steps (e) - (f) for all possible combinations.

7. The method of claim 1, further comprising generating a grid, overlaying the grid on the set of geodetic data, determining a number of control points to be generated in each portion of the grid, and then, in step (b), generating the control points according to the number of control points determined to be generated.

8. The method of claim 1, further comprising determining corresponding points in the set of Cartesian data and the set of geodetic data by identifying corresponding street intersections.

9. The method of claim 1, a portion of a grid including intersecting streets, a record for a control point further comprising using an identifier based on an intersecting street, the generating further including determining an initial number of control points to be considered in the portion of the grid based at least in part on the total number of intersecting streets.

10. A non-transitory computer-readable medium tangibly embodying computer-executable instructions including instructions for:
    (a) receiving, with the use of a processor in a computer, a set of Cartesian data and a set of geodetic data relating to a geographic area;
    (b) generating, with the use of the processor in the computer, a set of control points, each control point being associated with a coordinate expressed in terms of latitude and longitude, and with a corresponding point in the set of Cartesian data;
    (c) determining, with the use of the processor in the computer, a plurality of sets of Cartesian coordinates for each of the control points, each of the sets of Cartesian coordinates for one of the control points corresponding to a Cartesian system;
    (d) determining, with the use of the processor in the computer, a deviation for a combination, the combination including a control point and the corresponding Cartesian system, the deviation being a difference between coordinates for the point associated with the control point in the set of Cartesian data and the set of Cartesian coordinates for the control point;
    (e) modifying, with the use of the processor in the computer, a matched set of Cartesian coordinates according to the deviation, wherein the matched set of Cartesian coordinates include at least one set of Cartesian coordinates associated with the Cartesian system that is included in the combination, but further associated with a control point not in the combination;
    (f) determining, with the use of the processor in the computer, a cumulative deviation for the combination by determining a sum of distances of each set of matched Cartesian coordinates modified in step (e) from the coordinates for the point associated with the control point in the Cartesian data corresponding to the matched Cartesian coordinates;
    (g) repeating, with the use of the processor in the computer, steps (e)-(f) for a plurality of combinations; and
    (h) identifying, with the use of the processor in the computer, a combination associated with a minimum cumulative deviation.

11. The medium of claim 10, the instructions further comprising instructions for using easting and northing components of the minimum cumulative deviation to project points in the set of matched Cartesian data into the geodetic data.

12. The medium of claim 10, wherein the Cartesian system is at least one of Universal Transverse Mercator (UTM) or State Plane Coordinate System (SPC).

13. The medium of claim 10, wherein the geodetic data is based on a North American Datum.

14. The medium of claim 10, wherein the combination further includes a zone associated with the Cartesian system.

15. The medium of claim 10, wherein step (g) includes repeating steps (e) - (f) for all possible combinations.

16. The medium of claim 10, the instructions further comprising instructions for generating a grid, overlaying the grid on the set of geodetic data, determining a number of control points to be generated in each portion of the grid, and then, in step (b), generating the control points according to the number of control points determined to be generated.

17. The medium of claim 10, the instructions further comprising instructions for determining corresponding points in the set of Cartesian data and the set of geodetic data by identifying corresponding street intersections.

18. A system, comprising a computer configured to:
(a) receiving, with the use of a processor in a computer, a set of Cartesian data and a set of geodetic data relating to a geographic area;
(b) generating, with the use of the processor in the computer, a set of control points, each control point being associated with a coordinate expressed in terms of latitude and longitude, and with a corresponding point in the set of Cartesian data;
(c) determining, with the use of the processor in the computer, a plurality of sets of Cartesian coordinates for each of the control points, each of the sets of Cartesian coordinates for one of the control points corresponding to a Cartesian system;
(d) determining, with the use of the processor in the computer, a deviation for a combination, the combination including a control point and the corresponding Cartesian system, the deviation being a difference between coordinates for the point associated with the control point in the set of Cartesian data and the set of Cartesian coordinates for the control point;
(e) modifying, with the use of the processor in the computer, a matched set of Cartesian coordinates according to the deviation, wherein the matched set of Cartesian coordinates include at least one set of Cartesian coordinates associated with the Cartesian system that is included in the combination, but further associated with a control point not in the combination;
(f) determining, with the use of the processor in the computer, a cumulative deviation for the combination by determining a sum of distances of each set of matched Cartesian coordinates modified in step (e) from the coordinates for the point associated with the control point in the Cartesian data corresponding to the matched Cartesian coordinates;
(g) repeating, with the use of the processor in the computer, steps (e)-(f) for a plurality of combinations; and
(h) identifying, with the use of the processor in the computer, a combination associated with a minimum cumulative deviation.

19. The system of claim 18, the computer further configured to use easting and northing components of the minimum cumulative deviation to project points in the set of matched Cartesian data into the geodetic data.

20. The system of claim 18, wherein the Cartesian system is at least one of Universal Transverse Mercator (UTM) or State Plane Coordinate System (SPC).

21. The system of claim 18, wherein the geodetic data is based on a North American Datum.

22. The system of claim 18, wherein the combination further includes a zone associated with the Cartesian system.

23. The system of claim 18, wherein step (g) includes repeating steps (e)-(f) for all possible combinations.

24. The system of claim 18, the computer further configured to generate a grid, overlay the grid on the set of geodetic data, determine a number of control points to be generated in each portion of the grid, and then, in step (b), generate the control points according to the number of control points determined to be generated.

25. The system of claim 18, the computer further configured to determine corresponding points in the set of Cartesian data and the set of geodetic data by identifying corresponding street intersections.

* * * * *